(12) United States Patent
Briggs et al.

(10) Patent No.: US 11,585,363 B1
(45) Date of Patent: Feb. 21, 2023

(54) WIRE RIVET

(71) Applicant: National Technology & Engineering Solutions of Sandia, LLC, Albuquerque, NM (US)

(72) Inventors: Timothy Briggs, Brentwood, CA (US); Kyle James LeBlanc, Berkeley, CA (US); Brian K. Holliday, Stockton, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 281 days.

(21) Appl. No.: 17/077,254

(22) Filed: Oct. 22, 2020

Related U.S. Application Data

(60) Provisional application No. 62/926,881, filed on Oct. 28, 2019.

(51) Int. Cl.
  *F16B 19/10*    (2006.01)
  *H01R 4/64*     (2006.01)

(52) U.S. Cl.
  CPC ........... *F16B 19/1045* (2013.01); *H01R 4/64* (2013.01)

(58) Field of Classification Search
  CPC .............. H01R 4/64; H01R 2019/1009; F16B 19/1045; F16B 19/1054; F16B 19/10
  USPC ...... 174/74 R, 78, 84 R, 88 R; 411/53, 54.1, 411/41, 43, 34, 60.1, 44, 45
  See application file for complete search history.

(56) References Cited

U.S. PATENT DOCUMENTS

| | | | | |
|---|---|---|---|---|
| 2,759,082 | A * | 8/1956 | Rea | B21J 15/08 228/139 |
| 3,073,205 | A * | 1/1963 | Siebol | B21J 15/045 29/524.1 |
| 3,148,578 | A * | 9/1964 | Gapp | F16B 19/1054 29/523 |
| 3,230,818 | A | 1/1966 | Siebol | |
| 3,317,882 | A * | 5/1967 | Schumacher | H01R 13/53 439/99 |
| 3,582,978 | A * | 6/1971 | Petersen | H01J 29/925 313/283 |
| 3,906,623 | A * | 9/1975 | Clabburn | H01R 4/10 174/94 R |
| 4,222,304 | A | 9/1980 | Yoshida et al. | |
| 4,556,351 | A | 12/1985 | Wollar et al. | |
| 4,936,725 | A * | 6/1990 | Eshraghi | F16B 19/1054 470/11 |

(Continued)

*Primary Examiner* — William H. Mayo, III
(74) *Attorney, Agent, or Firm* — Madelynne J. Farber; Mark A. Dodd

(57) ABSTRACT

A rivet assembly for securing a wire in electrical communication with a substrate having a hollow cylindrical body with a first opening at a proximal end and a second opening at a distal end. The rivet assembly further includes a wire with a portion in electrical communication with the cylindrical body. The rivet assembly yet further includes a compression mechanism configured for use selectively compressing the cylindrical body along an axial direction. Compression of the cylindrical body can cause diametric expansion of an outer diameter of the cylindrical body to retain the cylindrical body within a substrate. The rivet assembly additionally includes wire retention structure configured for holding the wire in electrical contact with the compressed cylindrical body.

20 Claims, 10 Drawing Sheets

(56) References Cited

U.S. PATENT DOCUMENTS

| | | | | |
|---|---|---|---|---|
| 5,102,274 | A | * | 4/1992 | Norton ................ F16B 19/1054 411/70 |
| 6,951,467 | B1 | * | 10/2005 | Hansen .................... H01R 4/06 439/82 |
| 7,887,273 | B2 | | 2/2011 | Vigliotti et al. |
| 8,851,813 | B2 | | 10/2014 | Smith et al. |
| 2012/0210557 | A1 | * | 8/2012 | Jones .................... B21J 15/043 411/500 |

* cited by examiner

WIRE RIVET

CROSS-REFERENCE TO RELATED APPLICATION

This application claims priority to U.S. Provisional Patent Application No. 62/926,881, filed on Oct. 28, 2019, and entitled "Wire Rivet". The entirety of this application is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Conventionally, electrically connecting a wire to a conductive substrate can be an arduous and complicated process. A surface of the substrate needs to be abraded to remove surface oxide layers, contamination, coating layers, and the like to establish a proper electrical connection between the wire and the substrate. Attaching the wire to the substrate then involves a complicated assembly process requiring thread tapping, threaded studs, bolts, nuts, washers, two-hand access, soldering, brazing, or the like to secure the wire to the substrate.

SUMMARY

The following is a brief summary of subject matter that is described in greater detail herein. This summary is not intended to be limiting as to the scope of the claims.

In an exemplary embodiment, provided is a rivet assembly for securing a wire in electrical communication to a conductive substrate. The rivet assembly for securing the wire in electrical communication with a substrate comprises a hollow cylindrical body with a first opening at a proximal end and a second opening at a distal end. The rivet assembly can further include a wire with a portion in electrical communication with the cylindrical body. The rivet assembly yet further includes a compression mechanism configured for selectively compressing the cylindrical body along an axial direction. Compression of the cylindrical body can cause diametric expansion of an outer diameter of the cylindrical body to secure the cylindrical body within a substrate. The rivet assembly additionally includes a wire retention structure configured for holding the wire in electrical contact with the compressed cylindrical body.

A method of securing the rivet assembly to the substrate includes the step of installing a hollow cylindrical body within a channel in a substrate. The method can further include the step of placing a wire in a wire retention structure such that a first portion of the wire is in electrical communication with the cylindrical body. The method can yet further include securing the cylindrical body within the channel by compressing the cylindrical body along an axial direction causing diametric expansion of an outer surface of the cylindrical body. Compressing the cylindrical body can further secure the wire in electrical communication with the cylindrical body and in electrical connection to the substrate.

Further, in accordance with various aspects, provided is a rivet assembly comprising a hollow cylindrical body with a first opening at a proximal end and a second opening at a distal end. The rivet assembly can further include a mandrel body extending through the cylindrical body. The mandrel body can include a mandrel head that extends outside the distal end of the cylindrical body and a mandrel tip that extends out of the proximal end of the cylindrical body. The mandrel head can have a cross-section larger than an inner diameter of the cylindrical body. The rivet assembly can further include a wire with a portion in electrical communication with the cylindrical body. The wire can be held in electrical communication with the cylindrical body by way of the mandrel head.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
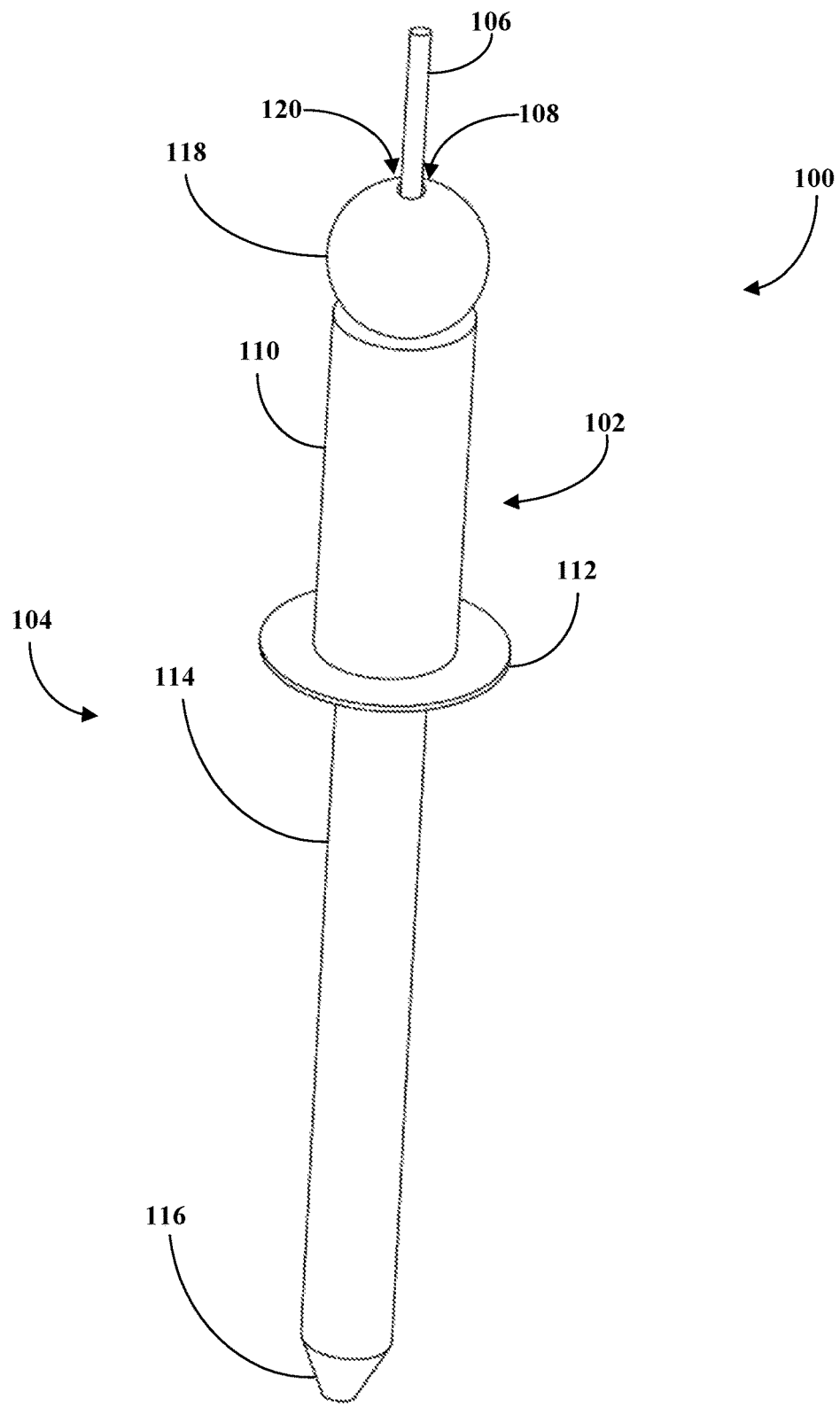
FIG. 1 illustrates an exemplary rivet assembly.

Various technologies pertaining to electrically coupling a wire to a substrate are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is an apparatus for electrically coupling a wire to a conductive substrate utilizing a hole in the substrate (or series of substrates mechanically held together with the rivet). Conventionally, attaching a wire to a surface of the substrate involves abrading the surface to remove oxide layers, coating, contaminants, and the like to permit intimate contact of the wire to the substrate. Moreover, securing the wire to the substrate surface can be a complicated procedure involving thread tapping, threaded studs, bolts, nuts, washers, two-hand access, soldering, brazing, or the like.

Turning to FIG. 1, illustrated is one embodiment of a rivet assembly 100 for securing a wire in electrical connection with a conductive substrate, wherein the rivet assembly 100 offers improvements over conventional approaches for electrically coupling a wire to a conductive substrate. The rivet assembly 100 comprises a rivet 102, means 104 for compressing the rivet to secure it within a substrate, a wire 106, and means 108 for holding the wire 106 in electrical communication with the rivet 102, and by extension the conductive substrate. In order to secure the rivet 102 to a substrate, the rivet 102 is inserted into a hole drilled (or the like, such as laser, waterjet, broached, punched, etc.) in the substrate and a tail end of the rivet 102 opposite the head of the rivet 102 is deformed to expand the size of the rivet 102 to mechanically lock through diametric interference the rivet 102 in the substrate(s).

The rivet 102 can comprise any suitable type that can be electrically connected to the wire 106. For instance, the rivet 102 may comprise a solid rivet, a high-strength structural steel rivet, a semi-tubular rivet, an Oscar rivet, a drive rivet, and/or the like. In the following embodiments, the rivet 102 comprises a blind rivet comprising a hollow cylindrical body with a central bore extending along a length of the rivet 102, however, any type of rivet 102 may be employed. One potential benefit of a blind rivet is it can be fully installed with access to only one side of the substrate.

In addition to being any suitable type, the rivet 102 can take any suitable shape for fastening to a substrate and/or plurality of substrates. In the illustrated embodiment, the rivet 102 comprises a rivet body 110 with a rivet head 112 at one end of the rivet body 110. The outer surface of the rivet body 110 and/or the rivet head 112 can have any suitable cross-section. In the illustrated embodiment, the cross-section of the outer surface of the rivet body 110 and the cross-section of the outer surface of the rivet head 112 is circular. In another embodiment, the cross-section may have other shapes (e.g., rectangular, triangular, hexagonal, polygonal, etc.). Moreover, the outer cross-sectional shape of the rivet body 110 and the outer cross-sectional shape of the rivet head 112 may be similar (as illustrated) and/or may vary. Further, the cross-section of the rivet body 110 and/or rivet head 112 can be similar along the length and/or may vary. Additionally, the outer cross-sections of the rivet body 110 and the rivet head 112 can be similar in size and/or can vary. For instance, in the illustrated embodiment, the outer cross-section of the rivet head 112 is larger than the outer cross-section of the rivet body 110.

As noted above, in the illustrated embodiment, the rivet 102 includes a bore that extends along a length of the rivet 102. More particularly, the bore extends through both the rivet body 110 and the rivet head 112. The bore can take any suitable shape and may have a uniform cross-section along its length and/or may vary. Moreover, an inner cross-section for the rivet body 110 and rivet head 112 can be similar in shape to their respective outer cross-sections (e.g., both the inner and outer cross-section are circular) and/or the cross-section may vary.

In order to secure the rivet within substrate by deforming the tail end of the rivet body 110, the rivet assembly 100 further includes the means 104 for compressing the rivet body 110. More particularly, the rivet assembly 100 may include means 104 for axially compressing the rivet body 110 which causes diametric expansion of the outer surface of the rivet body 110. In the illustrated embodiment, the means 104 for compressing the rivet body comprises a mandrel 114 that extends through the hollow cylindrical rivet body. The mandrel 114 includes a mandrel tip 116 that extends outwardly from the rivet head 112 and a mandrel head 118 outside the tail end of the rivet body 110. The mandrel head 118 can engage with the tail end of the rivet body 110 to compress or deform the rivet body 110 to secure the rivet 102 within a substrate. To this end, the mandrel head 118 can have a cross-section that is larger than the size of the inner cross-section of the rivet body 110. In the illustrated embodiment, the mandrel head 118 has a cross-section that is similar in size to the outer cross-section of the rivet body 110. The mandrel head 118 can take any suitable shape; and in the illustrated embodiment is spherical with a circular cross-section. In another embodiment, the mandrel head 118 may comprise a rounded flange (similar to the rivet head 112), a wedge, and/or the like. In a further embodiment, the wire can serve as the mandrel with a mandrel head secured on the wire to allow the wire to exit the front side of the hole, as will be described in detail below.

As briefly mentioned above, in order to transmit electricity to and/or away from the substrate(s) the rivet 102 is secured in, the rivet assembly 100 further includes the wire 106 and means 108 for retaining the wire 106 in electrical communication with the rivet 102. In certain embodiments, the wire 106 may extend into the rivet 102, such as into the central bore of the rivet 102; while in other embodiments, the wire 106 is adjacent the rivet 102 and electrically connected thereto by another material. In the illustrated embodiment, the wire 106 extends outwardly from the tail end of the rivet 102; while in other embodiments, the wire 106 may extend outwardly from the rivet head 112 or another location along the length of the rivet 102.

Figure 2:
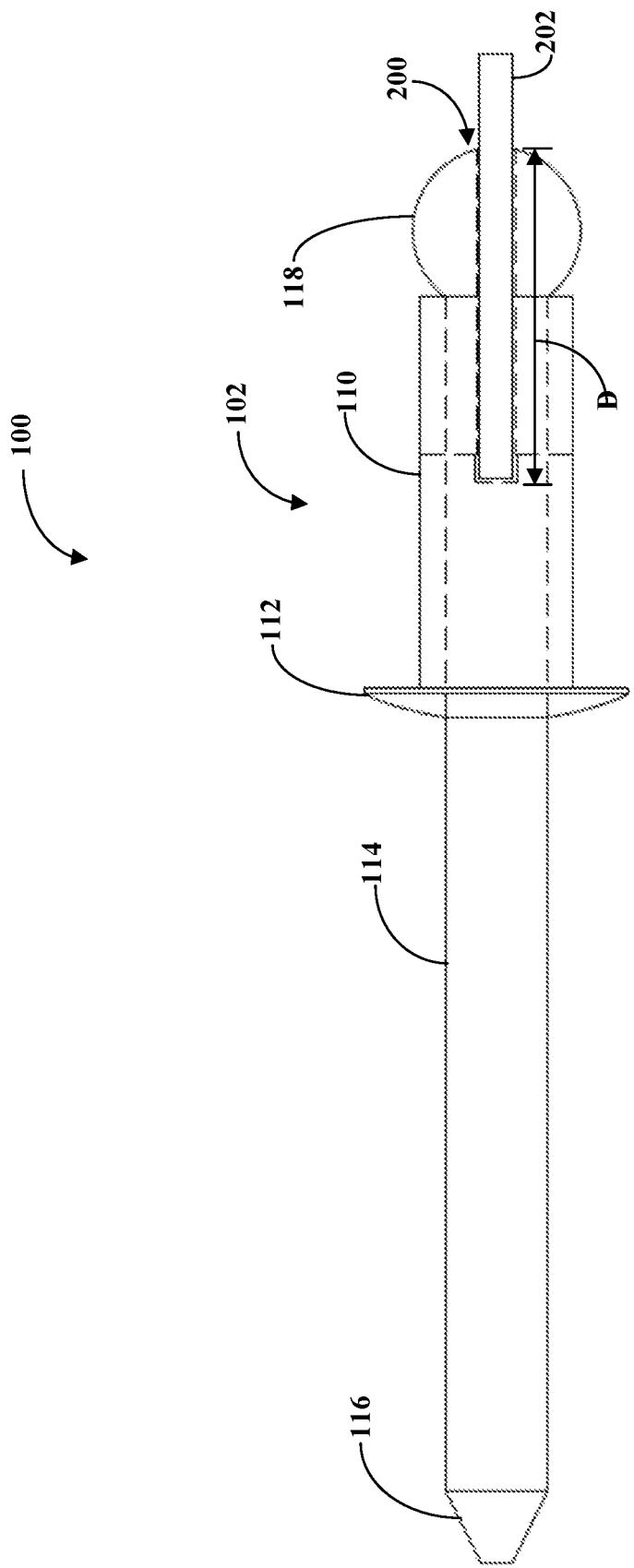
FIG. 2 illustrates another exemplary rivet assembly.

The wire retention means 108 can take any suitable shape and/or configuration for holding the wire 106 in electrical communication with the rivet 102, and by extension the substrate(s), when the rivet 102 is secured within the substrate(s). For example, in the illustrated embodiment, a hole 120 is drilled in the mandrel head 118. The hole 120 can extend for any suitable amount into the mandrel 114 and at any suitable orientation. For instance, illustrated in FIG. 2 is an embodiment of a hole 200 in the mandrel head 118. In the illustrated embodiment, the hole 200 extends along a central axis of the mandrel 114 for a length D in the mandrel 114. The length D is large enough that when the mandrel head 118 is adjacent the tail end of the rivet 102, the hole 200 extends into the central bore of the rivet 102. Accordingly, when the mandrel head 118 is used to compress the rivet body 110 to secure the rivet 102 within a substrate(s), the wire 202, extending the entire length D of the hole 200, will be secured within the central bore of the rivet 102. In addition to compressing the rivet body 110, securing the rivet 102 within the substrate(s) can also compress the mandrel head 118 securing the wire 202 within the hole 200 to prevent accidental disconnect of the wire 202 from the substrate(s).

In certain embodiments, the mandrel head 118 is made of a material with a level of ductility that permits a hole in the mandrel head 118 to stretch to accommodate the wire. In another embodiment, additional modifications are made to the mandrel head 118 to allow for a wire to be inserted into the mandrel head 118. For instance, modifications can be made to the mandrel head 118 to increase its flexibility above a threshold amount to ease insertion of the wire.

Figure 3:
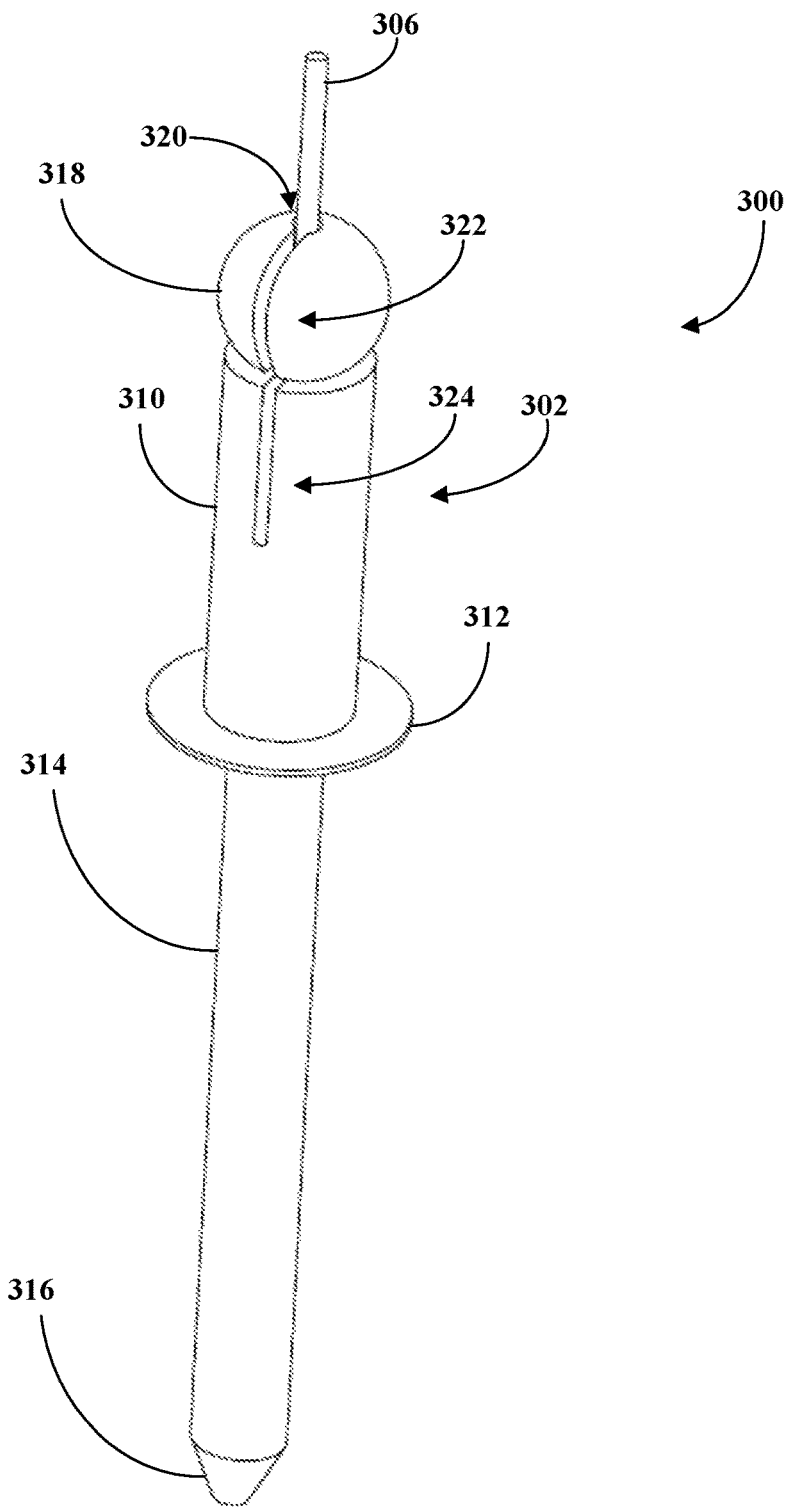
FIG. 3 illustrates yet another exemplary rivet assembly.
Figure 4:
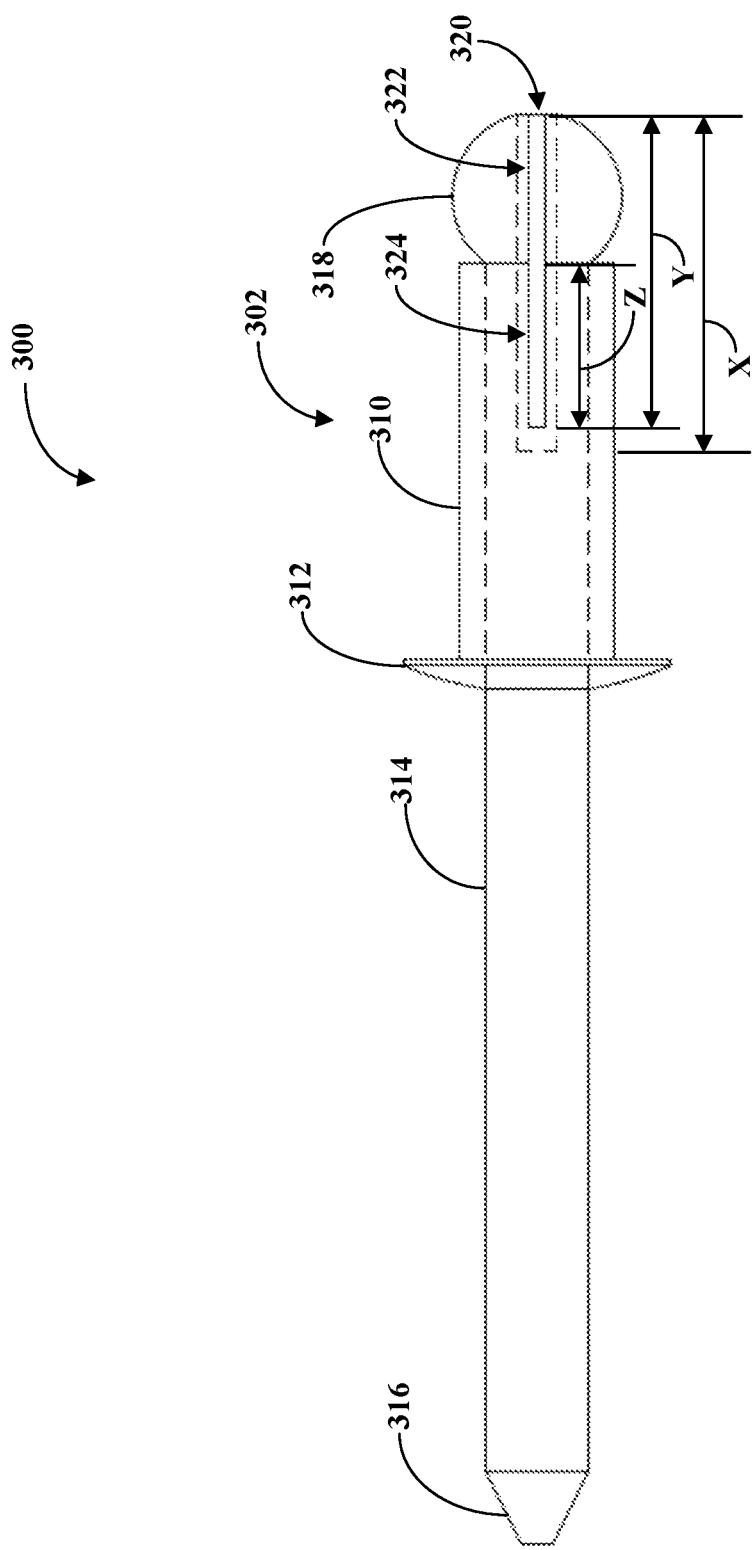
FIG. 4 illustrates a further rivet assembly.

Turning to FIGS. 3 and 4, illustrated are modifications that can be made to ease insertion of a wire. Illustrated in FIG. 3 is a rivet assembly 300 similar to the one described above with respect to FIG. 1 with modifications that increase flexibility to ease insertion of the wire and to provide a small removal of material from the mandrel head for the subsequent compression to lock the wire in place of the central bore of the mandrel. The rivet assembly 300 includes a rivet 302, a mandrel 314 extending through a central bore in the rivet 302, and a wire 306 secured within the mandrel 314. In the illustrated embodiment, the rivet 302 comprises a cylindrical rivet body 310 and a rivet head 312 comprising a domed flange at one end of the rivet body 310. The illustrated mandrel 314 includes a mandrel tip 316 at one end adjacent the rivet head 312 and a mandrel head 318 at an opposite end of the mandrel 314 adjacent the tail end of the rivet 302. The mandrel head 318 includes a hole 320, similar to the hole described above with reference to FIG. 1, that extends into the mandrel 314. In order to increase flexibility of the mandrel 314 to permit insertion of wire 306, the mandrel 314 further includes a slit 322 cut into the mandrel head 318. The slit 322 can take any suitable shape, size, and/or orientation that permits flexure of the mandrel 314 to accommodate the wire. For instance, in the illustrated embodiment, the slit 322 extends through the mandrel head 318 bisecting the mandrel head 318 into equal parts and intersects with the hole 320. Any suitable number of slits may be used to increase flexibility of the mandrel head 318. In the illustrated embodiment, the mandrel head 318 includes a single slit 322. In another embodiment, the mandrel head 318 includes a plurality of intersecting slits. For instance, the mandrel head 318 can include two slits that are perpendicular to each other forming an "X" with each slit intersecting the hole 320.

In order to increase flexibility of the rivet assembly 300 for insertion of the wire 306, the rivet 302 may include a slit 324 similar to the slit 322 in the mandrel head 318. More particularly, the slit 324 bisects a portion of the rivet body 310 at the tail end of the rivet 302. In one embodiment, the slit 322 in the mandrel head 318 and the slit 324 in the river body 310 can be aligned (as illustrated), such that as mandrel head 318 flexes at the slit 322, the rivet body 310 can flex at their respective slit 324. In another embodiment, the slit 322 and the slit 324 can be offset. Moreover, the number of slits in the mandrel head 318 and the number of slits in the rivet body 310 can be the same and/or they may vary.

The hole 320 in the mandrel 314, the slit 322 in the mandrel 314, and the slit 324 in the rivet body 310 can extend for any suitable length. Illustrated in FIG. 4 is one embodiment of exemplary lengths. In the illustrated embodiment, the hole 320 extends for a length X in the mandrel 314 and the slit 322 extends for a length Y in the mandrel 314 that is smaller than the length X to prevent a wire from inadvertently coming out of the hole 320 before the wire is compressed in the mandrel 314 when the rivet 302 is secured in the substrate(s). In the illustrated embodiment, the slit 324 in the rivet body 310 extends for a length Z which can be equal to the length Y of the slot 322 minus the diameter of the mandrel head 318 such that the end point of the slit 322 and the end point of slit 324 are equal. In another embodiment, the end point of the slit 322 and the end point of the slit 324 can vary.

Figure 6:
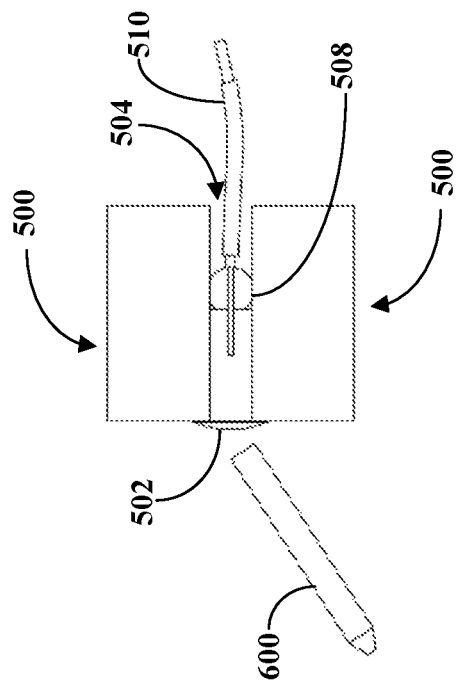
FIG. 6 illustrates an exemplary rivet assembly secured within a substrate.
Figure 5:
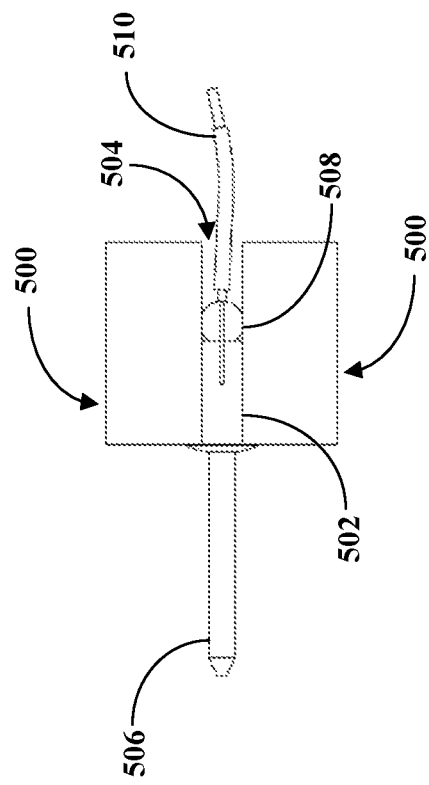
FIG. 5 illustrates an exemplary rivet assembly installed in a substrate.

Turning now to FIGS. 5 and 6, illustrated is an embodiment of securing a rivet assembly in a channel and/or a hole in a substrate. Illustrated in FIG. 5 is a rivet 502 inserted into a channel 504 in a substrate 500. In the illustrated embodiments, the rivet 502 comprises a blind rivet that uses a mandrel to compress the rivet 502 to secure it within the substrate 500. The mandrel extends through the rivet 502 with a mandrel head 508 outside one end of the rivet 502 and a mandrel stem 506 outside an opposing end of the rivet 502. In order to secure the rivet 502 within the channel 504, the mandrel stem 506 is pulled along an axial direction causing the mandrel head 508 to deform/compress the tail end of the rivet 502 to diametrically expand the rivet 502. In order to direct electrical current away from and/or toward the substrate 500, a wire 510 is attached to the rivet 502 via the mandrel head 508. As the mandrel head 508 is pulled axially, the wire 510 is correspondingly pulled as well maintaining electrical contact with the rivet 502 and substrate.

Turning now to FIG. 6, illustrated is the rivet 502 of FIG. 5 in the secured state within the substrate 500. In the secured state, the rivet 502 is compressed axially which causes diametric expansion of the rivet 502 securing the rivet 502 within the channel 504. In addition to being designed for use compressing the rivet 502, excess material 600 of the mandrel that extends from a head of the rivet 502 in the secured state can be designed to break off and/or be removed from the remainder of the mandrel so the remainder of the mandrel is flush with the head of the rivet 502. In the secured state, the wire 510 is compressed within the mandrel head 508 and the rivet 502 preventing unintentional disconnect of the wire 510 and the substrate 500.

Figure 7:
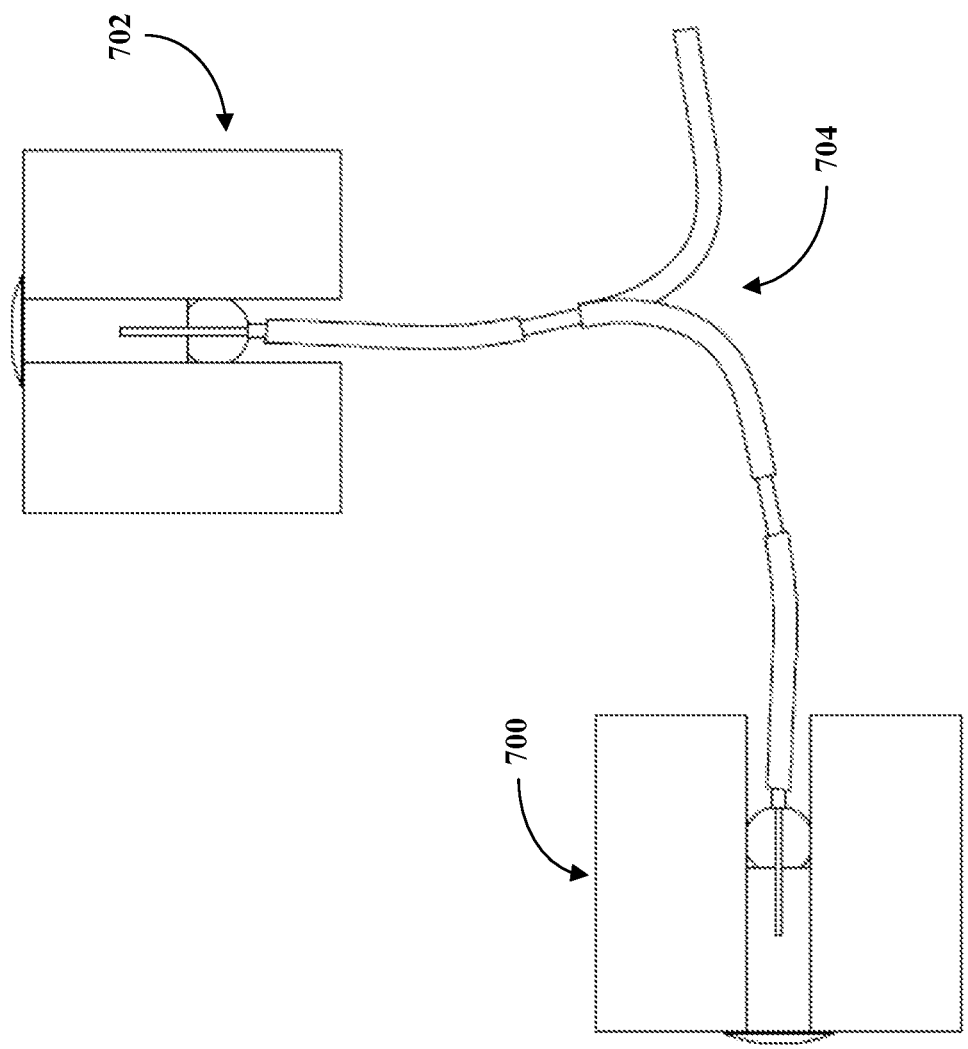
FIG. 7 illustrates a plurality of rivet assemblies secured within respective substrates connected by a shared wire.

The wire electrically connected to the substrate(s) can then be connected to any suitable other location, such as a computer readout, a ground, or the like. In another embodiment, multiple rivets may be chained together via a shared electrical wire. The electrically connected rivets may be in separate channels within the same substrate(s) and/or may be spread about in different substrates. For instance, FIG. 7 illustrates one embodiment with a first rivet secured within a first substrate, indicated by the numeral 700, and a second rivet secured within a separate second substrate, indicated by the numeral 702, that are connected linearly, e.g. daisy-chained, via a shared electrical circuit 704. Any number of rivets in shared or separate substrates can be daisy-chained together.

Figure 8:
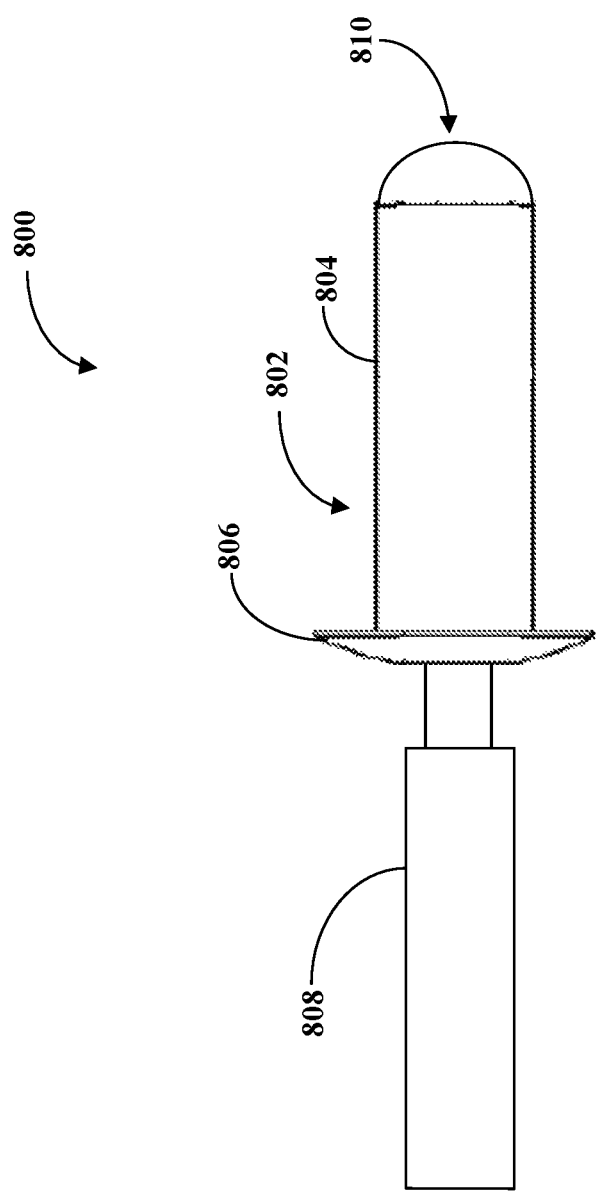
FIG. 8 illustrates an exemplary rivet assembly.

As briefly mentioned above, the wire can extend from any suitable location on the rivet. In the previous embodiments, the wire extends from a tail end of the rivet. Illustrated in FIG. 8 is one embodiment of a wire extending from the rivet head of the rivet. In contrast to the above described embodiments, instead of the mandrel head being on a mandrel, the mandrel head is attached to the wire and the wire is pulled to compress the rivet. In the rivet assembly 800 illustrated in FIG. 8, a wire 808 extends from a rivet head 806 of a rivet 802. The illustrated wire 808 extends through a central bore of the rivet 802 and includes a compression flange 810 adjacent the tail end of a rivet body 804. The flange 810 is sized such that its cross-section is larger than an inner cross-section of the rivet body 804 to prevent the wire from being pulled through the rivet 802 during compression. Moreover, similar to the mandrel head described above, the compression portion of the wire can have a cross-section similar to the outer cross-section of the rivet body and/or can vary. This embodiment of a rivet assembly is useful for electrically coupling to a substrate when the hole the rivet is secured in does not extend through the entire substrate and access to the rear of the rivet, and by extension the mandrel head, is limited. Further, it is to be noted that the compression flange 810 can be replaced with a mandrel head, and the wire 808 can replace a mandrel stem. In such an embodiment, rather than the mandrel stem being pulled and breaking away, the wire 808 is pulled, resulting in diametric expansion of the rivet body 804 and securing of the rivet 802 within a channel.

Figure 9:
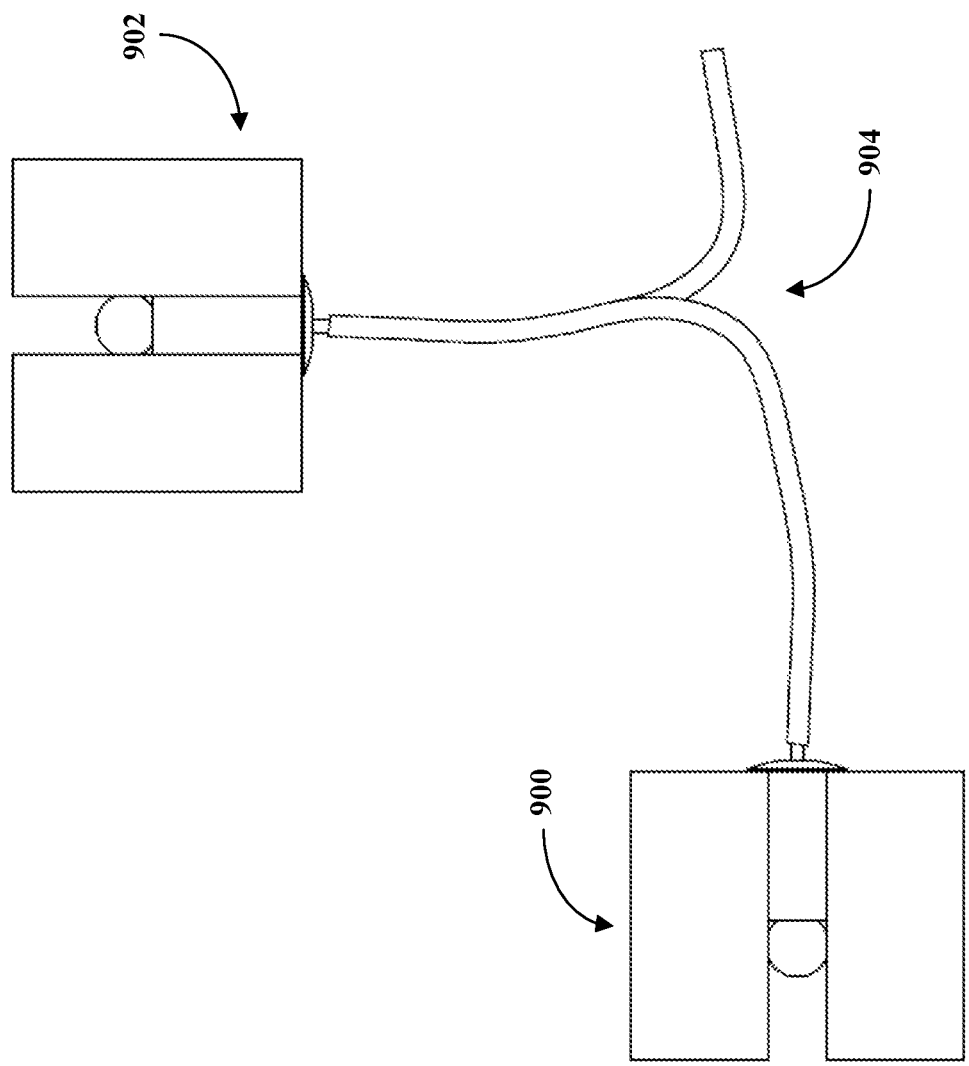
FIG. 9 illustrates another plurality of rivet assemblies secured within respective substrates connected by a shared wire.

As described above with respect to FIG. 7, multiple rivets may be daisy-chained together via a shared electrical circuit. In the embodiment illustrated in FIG. 9, a first rivet secured within a first substrate with a wire extending from a head of the first rivet (indicated by FIG. 900) and a second rivet within a second substrate with a wire extending from a head of the second rivet (indicated by the numeral 902) are connected linearly via a shared electrical circuit 904. In the illustrated embodiment, both rivet assemblies have the wire coming out of the rivet head. In another embodiment, they can vary, for instance one rivet in a shared electrical circuit can have wire extending from a rivet head while another rivet in the shared electrical circuit can have wire extending from the tail end of the rivet.

Figure 10:
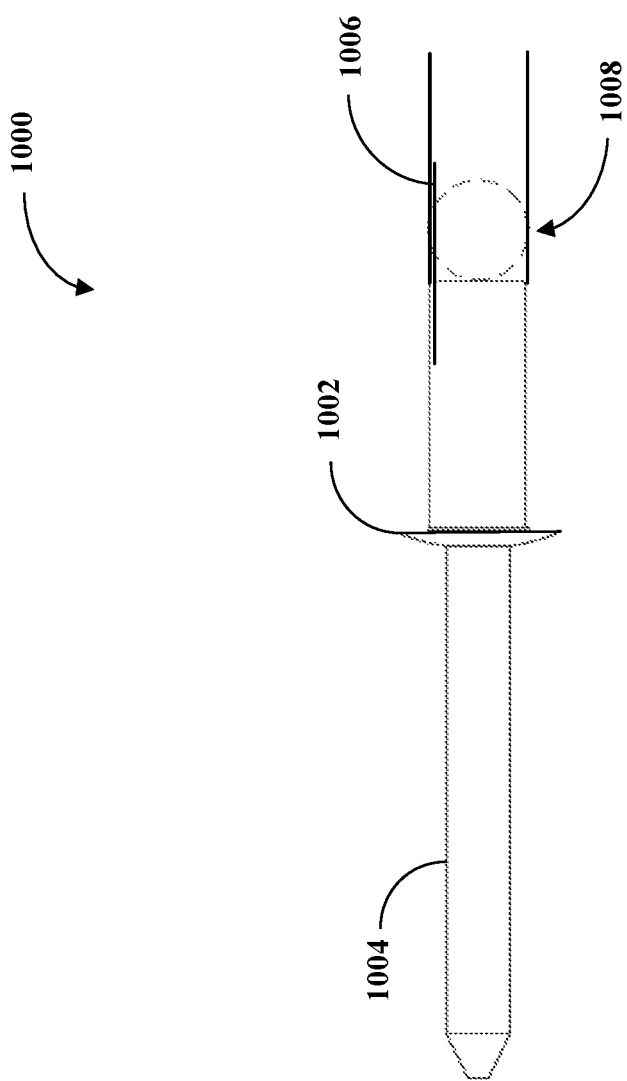
FIG. 10 illustrates another exemplary rivet assembly

Turning now to FIG. 10, illustrated is another embodiment of a rivet assembly 1000. As briefly mentioned above, the wire can be attached to any suitable location in the rivet assembly that permits electrical communication between the wire and the substrate(s). In some of the previously illustrated embodiments, the wire is secured within a mandrel head. In the embodiment illustrated in FIG. 10, the wire is instead sandwiched between an inner surface of the rivet and the mandrel. In the illustrated embodiment, the rivet assembly 1000 includes a rivet 1002 comprising a hollow cylindrical body and a mandrel 1004 that extends through an interior of the rivet 1002 with a mandrel head 1008 at one end. A portion of a wire 1006 is then sandwiched between the inner surface of the rivet 1002 and the mandrel 1004; and the wire 1006 extends from the rivet 1002 at any suitable orientation. In the illustrated embodiment, the wire 1006 extends from a tail end of the rivet 1002, while in other embodiments the wire 1006 can extend from a head of the rivet 1002. Any suitable amount of wire 1006 can be sandwiched between the mandrel 1004 and the rivet 1002. For instance, portions of the wire 1006 can be equitably arranged about the inner circumference of the rivet 1002. In another example, the wire 1006 is arranged at a single location around the inner circumference of the rivet 1002.

The parts of the rivet assembly can be made of any suitable material. Similar material can be used for more than one of the parts in the rivet assembly (e.g., the rivet and the mandrel can be made of the same material) and/or the materials can vary. The material may be selected based on a desired characteristic of the particular part. For instance, the compression means can be formed of a material that is tougher than the material used to form the rivet to prevent the compression means deforming while compressing the rivet. In one example, the mandrel can be formed of a steel alloy, aluminum alloy, a metal composite, a plastic composite, and/or the like. In another example, the rivet can be formed of an aluminum composite, a plastic composite, and/or the like. In another example, the wire can be a coaxial cable, an unbraided wire, a copper stranded wire, an aluminum wire, and/or the like.

The materials may further be selected to provide one or more attributes to the rivet assembly. For example, material can be selected to increase contact resistance over a lifetime of the rivet. The rivet assembly can function similar to a structural health monitoring device because oxidation or mechanical degradation of the rivet and/or mandrel results in a particular electric signature detectable through the wire. In another example, material can be selected to decrease contact resistance over a lifetime of the rivet. For instance, the mandrel can have material with a contact resistance that degrades over time resulting in a fusible link between the wire and the mandrel. Instead of inserting the wire into a hole in the mandrel, the wire and the mandrel can be press fit together and overtime the wire fuses to the mandrel.

The rivet assembly can further be configured to filter the electricity transmitted to and/or from the wire. For instance, the wire can include a mesh that filters out certain frequency wavelengths. Modifying the mesh can modify the frequency wavelengths that are filtered. In another example, the rivet assembly can include an insulating material layer that filters out certain frequency wavelengths.

Figure 11:
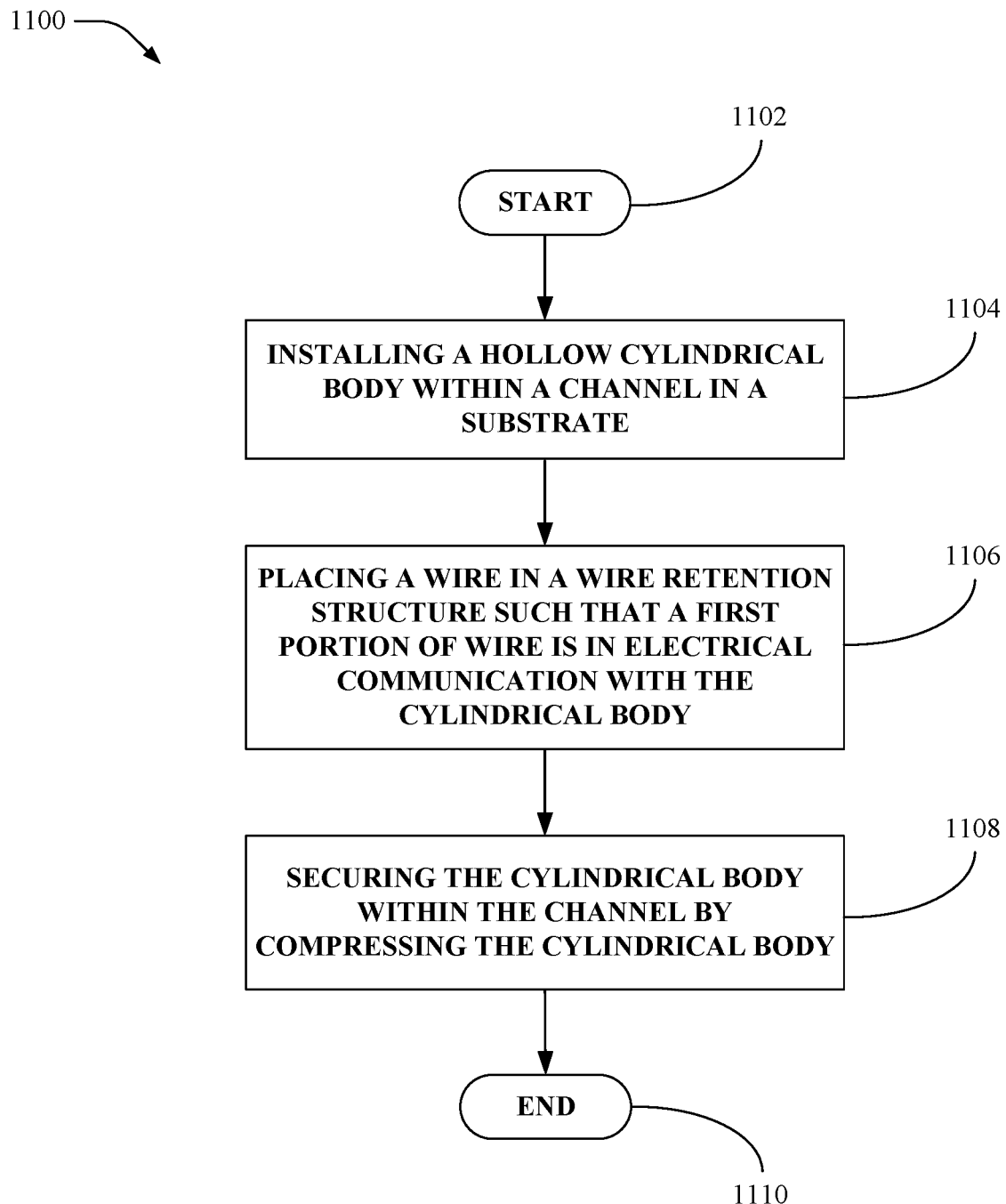
FIG. 11 is a flow diagram that illustrates an exemplary methodology for attaching a rivet assembly to a substrate.

FIG. 11 illustrates an exemplary methodology relating to attaching a rivet assembly to a substrate. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Referring now to FIG. 11, an exemplary methodology 1100 is illustrated. The methodology 1100 starts at 1102, and at 1104, a hollow cylindrical body is installed within a channel in a substrate. At 1106, a wire is placed in a wire retention structure such that a first portion of the wire is in electrical communication with the cylindrical body. At 1108, the cylindrical body is secured within the channel by compressing the cylindrical body along an axial direction causing diametric expansion of an outer surface of the cylindrical body. Compressing the cylindrical body further secures the wire in electrical communication with the cylindrical body. The methodology 1100 concludes at 1110.

In an embodiment, the methodology 1100 further includes placing a mandrel body in the cylindrical body such that mandrel head extends outwardly from a first end of the cylindrical body and a mandrel tip extends outwardly from a second end of the cylindrical body. In one version of this embodiment, the wire retention structure comprises a hole extending inwardly from the mandrel head. The step of placing the wire in the wire retention structure comprises inserting the wire into the hole. In another version of this embodiment, the step of placing the wire in the wire retention structure comprises sandwiching the wire between the mandrel body and an inner diameter of the cylindrical body. The wire retention structure is formed by interaction between the mandrel body and the inner diameter of the cylindrical body.

In another embodiment, the methodology 1100 comprises placing the wire in a second wire retention structure such a second portion of the wire is in electrical communication with a second cylindrical body.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A rivet assembly comprising:
    a hollow cylindrical body with a first opening at a proximal end and a second opening at a distal end;
    a wire with a portion in electrical communication with the cylindrical body;
    a compression mechanism configured for compressing the cylindrical body along an axial direction, wherein compression of the cylindrical body causes diametric expansion of an outer diameter of the cylindrical body to retain the thus compressed cylindrical body within a substrate; and
    a wire retention structure configured for holding the wire in electrical contact with the compressed cylindrical body, wherein the wire retention structure comprises a hole extending into the compression mechanism, wherein the compression mechanism is further configured for compressing the hole around the wire to thereby retain the wire within the compression mechanism upon compressing the cylindrical body.

2. The rivet assembly of claim 1, wherein the compression mechanism comprises a mandrel body that extends through the cylindrical body with a mandrel head that extends outside the distal end of the cylindrical body and a mandrel tip that extends out of the proximal end of the cylindrical body, wherein the mandrel head has an outer diameter larger than an inner diameter of the cylindrical body.

3. The rivet assembly of claim 2, wherein the hole extending into the compression mechanism comprises a hole extending into the mandrel head.

4. The rivet assembly of claim 3, wherein the wire retention structure further comprises a compression slot cut into the mandrel head and intersecting the hole, wherein the compression slot permits flexure of the mandrel head.

5. The rivet assembly of claim 4, wherein the hole extends a first length into the mandrel body and the compression slot extends a second length into the mandrel body, wherein the first length is larger than the second length.

6. The rivet assembly of claim 4, wherein the wire retention structure further comprises a second compression slot cut into the cylindrical body, wherein the second compression slot is aligned with the compression slot.

7. The rivet assembly of claim 4, wherein the wire retention structure further comprises a plurality of compression slots cut into the mandrel head, wherein each compression slot in the plurality of compression slots intersects the hole, wherein the compression slot is in the plurality of compression slots.

8. The rivet assembly of claim 2, wherein the wire is sandwiched between the mandrel body and an inner diameter of the cylindrical body, wherein the wire retention structure is further formed by interaction between the mandrel body and the inner diameter of the cylindrical body.

9. The rivet assembly of claim 2, wherein the cylindrical body is formed of a first material and the mandrel body is formed of a second material, wherein the first material is different from the second material.

10. The rivet assembly of claim 1, wherein the compression mechanism comprises a compression structure formed on a second portion of the wire extending from the proximal end of the cylindrical body or the distal end of the cylindrical body, wherein the compression structure has a cross-section larger than an inner diameter of the cylindrical body.

11. The rivet assembly of claim 1, wherein the wire includes a second portion in electrical communication with a second hollow cylindrical body.

12. The rivet assembly of claim 1, wherein the rivet assembly further comprises a material between the cylindrical body and the wire with a threshold insulation value.

13. A method for attaching a rivet assembly to a substrate comprising:
    installing a hollow cylindrical body within a channel in a substrate;
    placing a wire in a wire retention structure such that a first portion of the wire is in electrical communication with the cylindrical body, wherein the wire retention structure comprises a hole extending into a compression mechanism; and
    securing the cylindrical body within the channel with the compression mechanism that compresses the cylindrical body along an axial direction causing diametric expansion of an outer surface of the cylindrical body, wherein compressing the cylindrical body further secures the wire in electrical communication with the substrate and in the hole extending into the compression mechanism.

14. The method of claim 13,
    wherein the compression mechanism includes a mandrel body, and
    wherein the method further comprises:
    placing the mandrel body in the cylindrical body such that a mandrel head extends outwardly from a first end of the cylindrical body and a mandrel tip extends outwardly from a second end of the cylindrical body.

15. The method of claim 14, wherein the wire retention structure that comprises the hole extending into the compression mechanism comprises a hole extending into the mandrel head, wherein placing the wire in the wire retention structure comprises inserting the wire into the hole extending into the mandrel head.

16. The method of claim 14, wherein placing the wire in the wire retention structure comprises sandwiching the wire between the mandrel body and an inner diameter of the cylindrical body, wherein the wire retention structure is further formed by interaction between the mandrel body and the inner diameter of the cylindrical body.

17. The method of claim 13, further comprising:
    placing the wire in a second wire retention structure such that a second portion of the wire is in electrical communication with a second cylindrical body.

18. A rivet assembly comprising:
    a hollow cylindrical body with a first opening at a proximal end and a second opening at a distal end; and
    a mandrel body extending through the cylindrical body, wherein the mandrel body includes a mandrel head that extends outside the distal end of the cylindrical body and a mandrel tip that extends out of the proximal end of the cylindrical body, wherein the mandrel head has an outer diameter larger than an inner diameter of the cylindrical body, wherein the mandrel head includes a hole extending thereinto, the hole configured to receive a wire, wherein a portion of the wire is held in electrical communication with the cylindrical body by way of the hole extending into the mandrel head, wherein the mandrel body is configured for compressing the cylindrical body along an axial direction, wherein compression of the cylindrical body causes diametric expansion of an outer diameter of the cylindrical body, wherein the mandrel body is configured for compressing the hole around the portion of the wire to thereby retain the portion of the wire within the hole upon compressing the cylindrical body.

19. The rivet assembly of claim 18, wherein the mandrel head further includes a compression slot cut into the mandrel head that intersects the hole, wherein the portion of the wire is retained within the hole.

20. The rivet assembly of claim 18, wherein a second portion of the wire is in electrical communication with a second cylindrical body.

\* \* \* \* \*